United States Patent [19]

Ali et al.

[11] Patent Number: 4,674,279
[45] Date of Patent: Jun. 23, 1987

[54] CONTROL SYSTEM FOR RUN-OF-RIVER HYDROELECTRIC PLANT

[75] Inventors: Mohammad A. Ali, Williamsville; George V. Cotroneo, Buffalo; Peter R. Rodrigue, Tonawanda; Robert T. Smith, Williamsville, all of N.Y.

[73] Assignee: Acres International Corporation, Buffalo, N.Y.

[21] Appl. No.: 649,859

[22] Filed: Sep. 12, 1984

[51] Int. Cl.[4] .............................................. F16D 31/02
[52] U.S. Cl. ........................................ 60/398; 290/43; 290/52; 322/35; 415/24
[58] Field of Search ....................... 60/398; 290/52, 43; 405/77, 78, 75; 415/24; 318/140, 149, 158; 322/22, 33, 35

[56] References Cited

U.S. PATENT DOCUMENTS

| | | | |
|---|---|---|---|
| 1,901,773 | 3/1933 | Pfau | 415/24 |
| 4,400,659 | 8/1983 | Barron et al. | 322/35 |
| 4,408,452 | 10/1983 | Tsunoda | 60/398 |
| 4,467,216 | 8/1984 | Murphy | 290/52 |
| 4,496,845 | 1/1985 | Ensign et al. | 290/43 |

FOREIGN PATENT DOCUMENTS

| | | | |
|---|---|---|---|
| 0028108 | 2/1980 | Japan | 60/398 |
| 403874 | 3/1974 | U.S.S.R. | 60/398 |

*Primary Examiner*—A. Michael Chambers
*Attorney, Agent, or Firm*—Christel, Bean & Linihan

[57] ABSTRACT

A control system for a hydroelectric power plant of the run-of-river type wherein the load on the turbine-generator units is matched to the flow of the river so that the units operate at the maximum head available for existing flow conditions to produce the maximum energy available from the river flow for the installed capacity of the plant and within the allowable, safe operating capability range of the turbine-generator units. Reservoir water level sensors provide a signals indicative of changing water level, sensors for generator electrical and thermal operating characteristics provide a signals related thereto, and a control connected to the water level sensors, to the generator sensors and to the turbine governor adjusts the turbine flow control devices to change the turbine power in response to changing river level within the safe and allowable operating range of the generator. Adjusting the turbine power to match the water available either when the reservoir level increases or decreases maintains maximum head for the power plant to obtain maximum energy therefrom. A tailwater level sensor and cavitation control also control the turbine flow control devices in an appropriate manner when a condition of cavitation is being approached. The control system typically is employed with a plurality of turbine-generator units in a hydroelectric power plant.

24 Claims, 8 Drawing Figures

4,674,279

CONTROL SYSTEM FOR RUN-OF-RIVER HYDROELECTRIC PLANT

BACKGROUND OF THE INVENTION

This invention relates to the art of controls of hydroelectric power plants, and more particularly to a new and improved control system for a hydroelectric plant of the run-of-river type.

A run-of-river hydroelectric plant is one in which the output of electricity depends upon the amount of water flowing in the river. It would be highly desirable to provide a control for a hydroelectric plant whereby at all times the load on the turbine-generator units of the plant match the flow of the river. In other words, it would be desirable to have the units operate at the maximum head available for existing flow conditions. This advantageously would result in producing maximum energy available from the river flow for the installed capacity of the hydroelectric plant. In providing the foregoing, it should be done in a controlled manner to be within the allowable and safe operating capability of the turbine-generator units.

SUMMARY OF THE INVENTION

It is, therefore, a primary object of this invention to provide a new and improved control system for a hydroelectric power plant of the run-of-river type.

It is a further object of this invention to provide such a control whereby at all times the load on the turbine-generator units of the plant match the flow of the river.

It is a further object of this invention to provide such a control causing the turbine-generator units to operate at maximum head available for existing flow conditions to provide maximum energy production from the plant.

It is a further object of this invention to provide such a control whereby the plant produces the maximum energy available from the river flow for the installed capacity of the plant.

It is a further object of this invention to provide such a control whereby the foregoing is accomplished within the allowable, safe operating capability of the turbine-generator units.

It is a more particular of this invention to provide such a control which has the capability of automatically adjusting the generation of electricity to within the allowable range of real power in watts, apparent power in volt-amperes, generator stator temperature, cavitation limits and stabilization limits.

It is a more particular object of this invention to provide such a control wherein as the foregoing quantities are adjusted the reactive power in reactive volt-amperes and/or the generator field temperature is automatically adjusted within allowable parameters.

It is a more particular object of this invention to provide such a control wherein the reactive power may be adjusted to maintain either constant bus voltage, constant power factor or constant reactive power supplied to or absorbed from the system.

It is a further object of this invention to provide such a control which is efficient and effective in operation.

The present invention provides a control system for a hydroelectric power plant of the run-of-river type wherein the load on the turbine-generator units is matched to the flow of the river so that the units operate at the maximum head available for existing flow conditions to produce the maximum energy available from the river flow for the installed capacity of the plant. The foregoing is provided by the control in a manner to be within the allowable, safe operating capability range of the turbine-generator units. The turbine-generator units are controlled and the turbine flow control means are controlled to maintain a predetermined water level in the reservoir leading to the power plant intake and to achieve maximum head on the plant for optimum energy production. When the river flow is greater than the capabilities of the plants, the turbine-generator units are set by the control for full flow, i.e. maximum power, consistent with operating limitations, until the river flows reduce below that which can be handled by the units at the gate opening.

There is provided means for sensing the reservoir water level and for providing a signal indicative of a change in water level, means for sensing generator electrical and thermal operating characteristics and for providing a signal related thereto, and control means operatively connected to the water level sensing means and the generator sensing means and connected in controlled relation to the turbine governor for adjusting the turbine flow control or modulating devices such as wicket gates, runner blades or nozzles to change the turbine power in response to changing river level within the safe and allowable operating range of the generator. Adjusting the turbine power to match the water available either when the reservoir level increases or decreases maintains maximum head for the power plant to obtain maximum energy therefrom. The generator thermal and electrical operating characteristics which are sensed included generator stator temperature, watts, reactive volt-amperes, terminal voltage, field current and field voltage. In addition, the system has the capability of increasing or decreasing the generator field current as a result of monitoring the aforementioned electrical characteristics. Also, there is provided means for sensing the tailwater level of water leaving the plant and cavitation control means operatively connected to the sensing means for controlling the turbine flow control or modulating devices in an appropriate manner when a condition of cavitation is being approached. The foregoing control system typically is employed with a plurality of turbine-generator units in a hydroelectric power plant.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENTS

Figure 1:
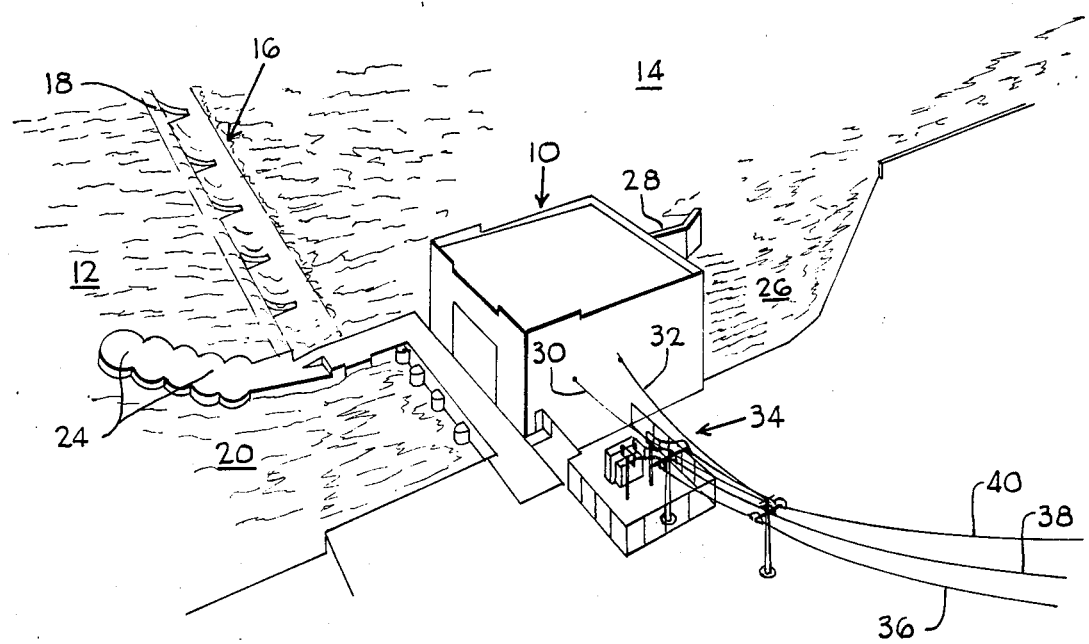
FIG. 1 is a perspective view, partly diagrammatic, of a hydroelectric power plant of the run-of-river type utilizing the control system of the present invention.

FIG. 1 illustrates a hydroelectric power plant of the run-of-river type which employs the control system of the present invention. The hydroelectric plant includes a powerhouse structure generally designated 10 adjacent a river having upper and lower levels 12 and 14, respectively, defined by a dam 16 having a crest 18. The upper level 12 is a reservoir and an intake channel or forebay 20 leads to the powerhouse intake defined by an intake guide wall structure 24. A tailwater channel 26 leads from the discharge of the power plant to the lower river level 14 as defined by a wall structure 28. The generated electrical output from the power plant is on lines 30,32 which are coupled through a transformer and a pole installation 34 to the three transmission lines 36,38 and 40 to carry the electrical power to locations of use.

Figure 2:
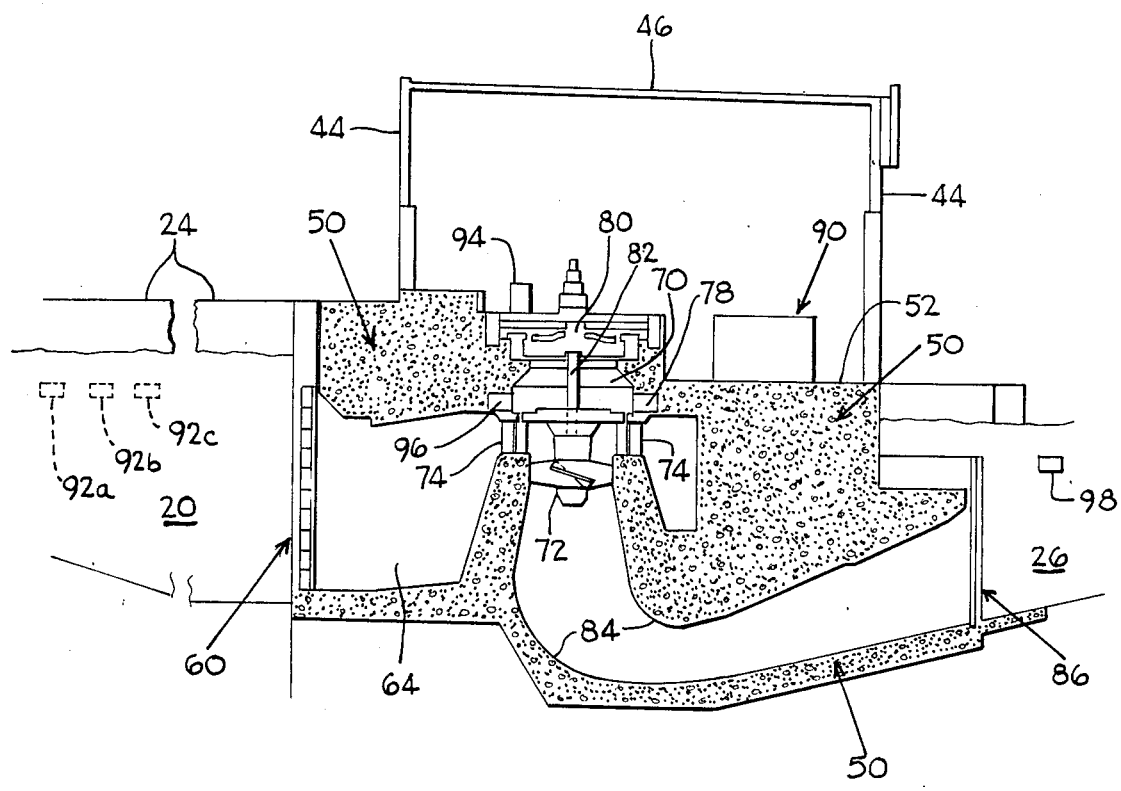
FIG. 2 is a vertical sectional view, partly diagrammatic, of the hydroelectric power plant of FIG. 1 and showing a turbine-generator unit therein controlled by the system of the present invention.

Referring now to FIG. 2, there is shown the interior of the powerhouse structure 10 and the intake section, power generating section and discharge section of the hydroelectric plant. A wall 44 and roof 46 structure rests on a foundation 50 which defines the base or floor 52 of the interior of the generator room as well as the intake, power generating and discharge sections of the plant. The powerhouse intake is generally designated 60 and is in communication with intake channel 20 of reservoir 12 and opens to a passage 64 leading from intake 60 to the power generating section. The latter includes a turbine 70 supported in a spiral case defined in the concrete foundation 50. The turbine has a main housing and runner 72 and supply of water to the runner 72 is controlled by flow control means in the form of wicket gate 74, the opening and closing of which is controlled in a known manner by a turbine governor shown diagramatically at 78. The flow control means includes flow control or modulating devices such as wicket gates, runner blades or nozzles. For convenience in description the present invention is illustrated with wicket gates, but it is to be understood that it is equally usable with such other turbine flow controls. A generator 80 is supported by foundation 50 above base 52 and driven by turbine 70 through shaft 82 in a known manner. Water exiting from the turbine runner 72 flows along a draft tube 84 defined in the foundation 50 leading to the discharge section 86 of the plant, which, in turn, opens to the tailrace channel 26.

The control according to the present invention is indicated diagrammatically at 90 and can be located wherever convenient in the interior of the powerhouse. In conjunction with control 90 there is provided means in the form of a plurality of sensors 92 for sensing the water level in reservoir 12 and providing electrical signals indicative thereof, in particular signal information relating to changing water level. There is also provided sensing means indicated diagrammatically at 94 operatively associated with generator 80 for providing signals indicative thereof, in particular signal information relating to thermal and electrical operating conditions of generator 80. As will be described in further detail, the sensing means designated 94 in FIG. 2 represents a plurality of individual sensors. There is also provided flow control or wicket gate position sensing means generally designated 96 for providing a signal indicative of the actual position of the flow control means or wicket gates 74. There is also provided tailwater sensing means 98 for providing electrical signal information indicative of the water level in the tail race channel 26 leading from the hydroelectric plant. In accordance with the invention, the control system operates to cause opening of the flow control means or wicket gates 74 to increase the operation of turbine 70 in response to rising river level in reservoir 12 and to cause closing of the flow control means or wicket gates 74 upon falling reservoir level, all within the safe and allowable operating range of generator 80. Furthemore, while one unit comprising the combination of turbine 70 and generator 80 is shown in FIG. 2 for convenience in illustration, the control system of the present invention has the capability of controlling a plurality of such turbine-generator units in a hydroelectric power plant. Thus, in an illustrative plant including a second unit identical to the combination of turbine 70 and generator 80, the second unit would be alongside the first unit, spaced therefrom in a direction normal to the plane of the paper as viewed in FIG. 2.

Figure 3:
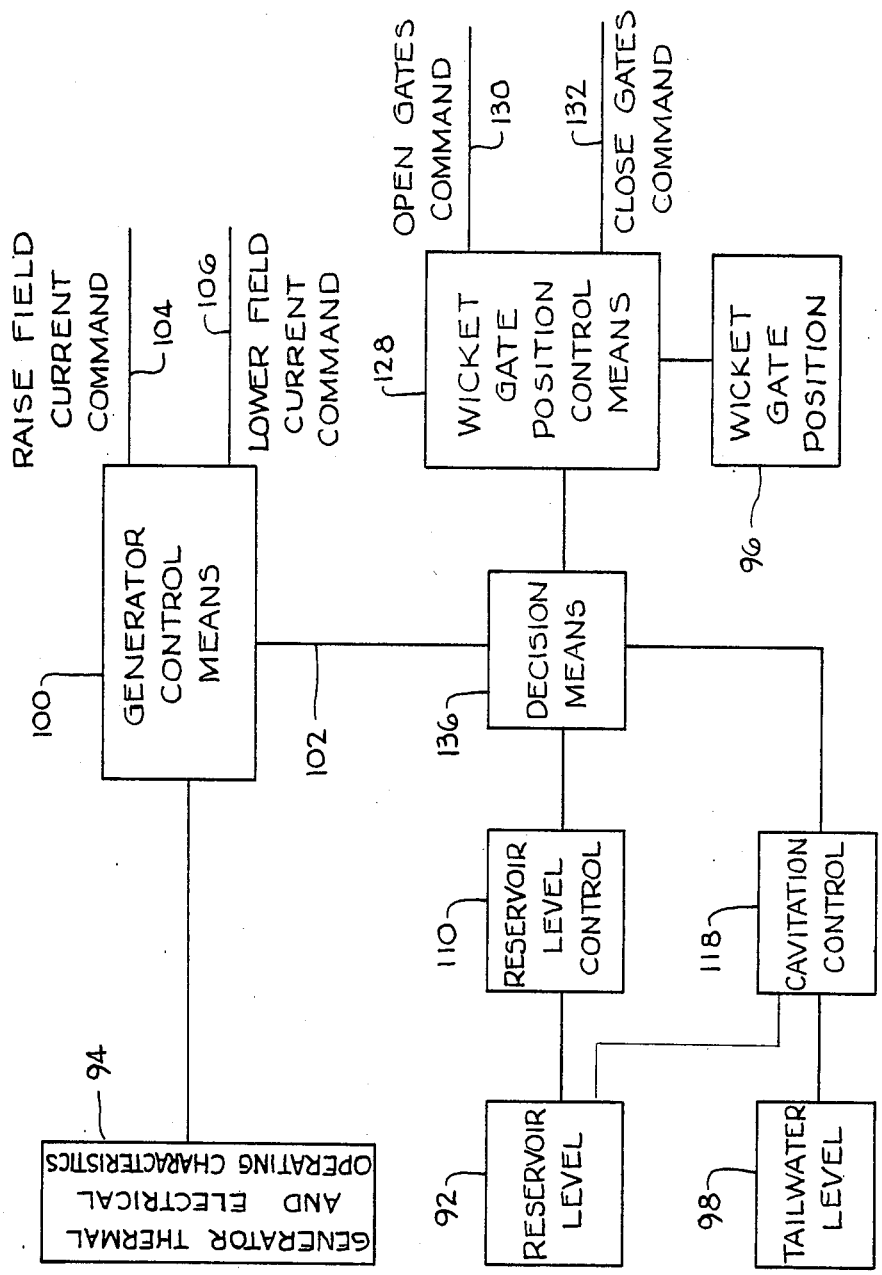
FIG. 3 is a schematic block diagram of the control system of the present invention.

The control system of the present invention is shown in the overall general block diagram of FIG. 3. The means 94 for sensing the generator thermal and electrical operating characteristics is connected to the input of the generator control means 100. Briefly, the generator control means compares signal information from sensing means 94 to reference information relating to safe allowable operating range of the generator 80 and provides a signal output at 102 in accordance with the comparison. As will be described in further detail presently, the sensing means 94 comprises a plurality of sensors for various quantities such as the generator stator temperature, kilowatts, reactive kilovolt amperes, terminal voltage, field voltage and field current. Similarly, the generator control means 100 includes a plurality of components such as a stator temperature controller, a volt ampere controller, a reactive volt ampere controller, and field temperature controller together with other functional and decisional components as will be described. All of the foregoing is for the purpose of preventing the generator 80 from operating out of the safe thermal and electrical capability range. The generator control means 100 also provides command signals at 104 and 106 to raise and lower, respectively, the generator field current to adjust the reactive power generation to maintain a preset power factor as will be described.

The means 92 for sensing reservoir level is connected to the input of a reservoir level control 110. Briefly, the control 110 compares a signal from the sensing means 92 to a reference and provides a command signal at the output 112 thereof to ultimately cause opening of the turbine flow control means or wicket gates in response to a rising water level in reservoir 12 and closing of the flow control means or wicket gates in response to a falling water level in reservoir 12. Safety considerations, for example those manifested in signal information from generator control means 100, will override this command signal as will be described. The means 98 for sensing tailwater level is connected to the input of a cavitation control designated 118 in FIG. 3. From information including the headwater and tailwater level the control 118 determines if an area of cavitation is being approached, i.e. whether the water flow condition through the turbine 70 is at such a level which could have the end result of cavitation pitting damage to the turbine blades, and the control 118 provides an appropriate command signal at the output 120.

The flow control or wicket gate position sensing means 96 provides signal information indicative of the actual position of the turbine flow control means or wicket gates 74. The control system further comprises flow control means or wicket gate position control means generally designated 128 operatively connected to the sensing means 96 for comparing the signal therefrom to a reference input in a manner producing output signals to command opening or closing of the flow control means or wicket gates 74 as a result of the comparison. In particular, the control means 128 provides command signals at 130 and 132 for the turbine governor to cause opening or closing of the turbine flow control means or wicket gates 74. The system further comprises decision means generally designated 136 connected to the outputs of the generator control means 100, the reservoir level control 110 and the cavitation control 118 for selecting signals therefrom according to a predetermined procedure and applying the selected signal to the reference input of the flow control means or wicket gate position control means 128. As a result, the turbine flow control means or wicket gates 74 are opened to increase the operation of turbine 80 in response to a rising water level in reservoir 12 and are closed in response to falling water level in reservoir 12, all within the safe allowable operating range of generator 80. While described for convenience with respect to the single unit comprising turbine 70 and generator 80, the control system shown generally in FIG. 3 has the capability of controlling a plurality of such turbine-generator units as will be described in detail presently.

As a result, the control system of the present invention advantageously causes the turbine-generator units to operate at maximum head available for existing flow conditions to provide maximum electrical energy production from the plant. At all times the load on the turbine-generator units is matched to the flow of the river, and the river level is controlled with the further advantages of maintaining navigation and environmental conservation. All of the foregoing is provided within the safe and allowable electrical and thermal operating range of the turbine-generator units.

Figure 4:
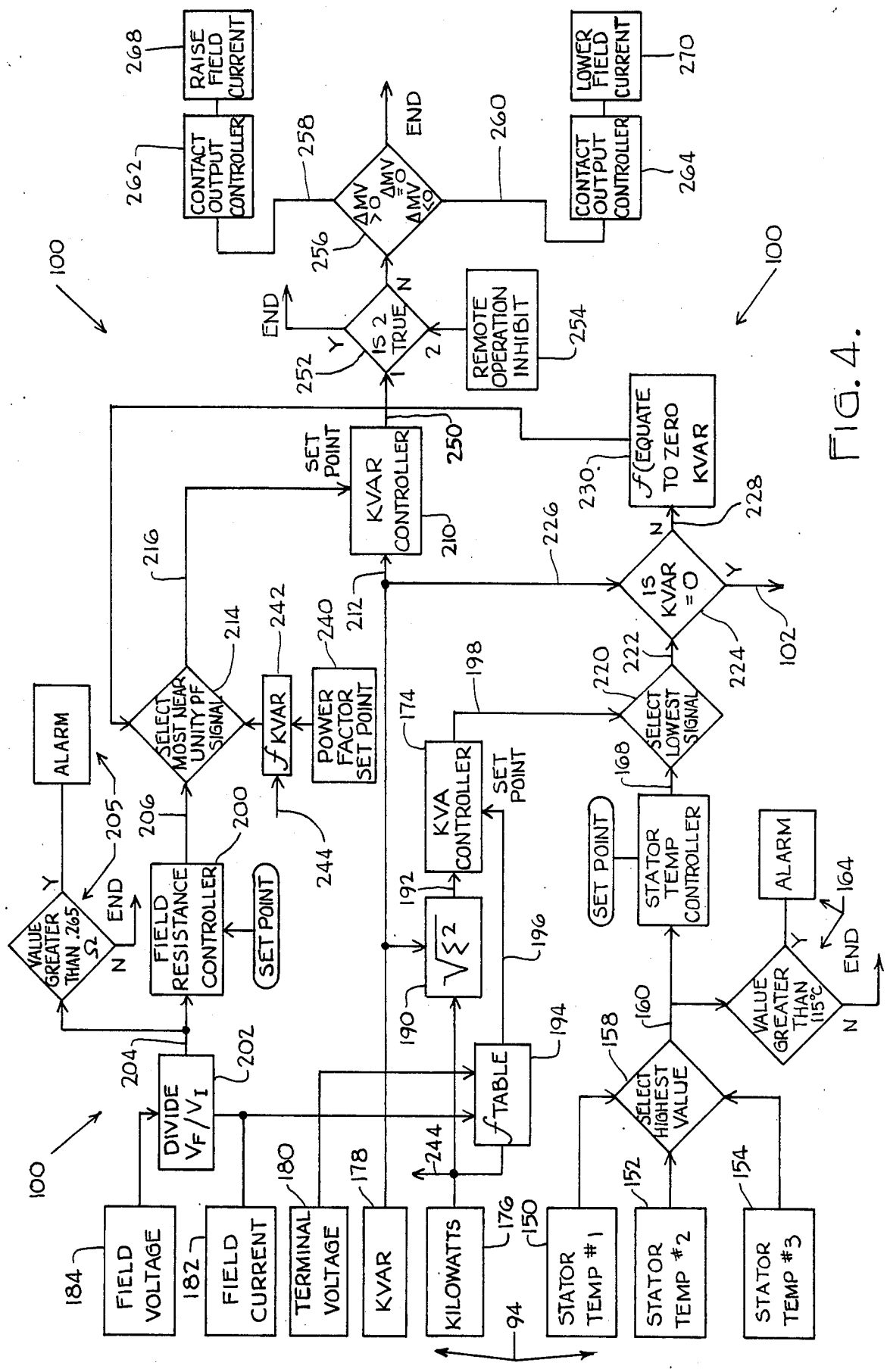
FIG. 4 is a schematic diagram showing in further detail the generator sensing means, generator control means and field current control of the system of FIG. 3.

FIG. 4 shows in further detail the generator sensing means 94, the generator control means 100 and the associated field current control of the system of FIG. 3. The generator stator temperature is monitored as a safety function to prevent each generator, i.e. the generator 80, from overheating during operation. Included within the generator sensing means 94 are a plurality, in the present illustration three, of generator stator temperature sensors 150,152 and 154. By way of example, in an illustrative system, each of the sensors can be a platinum resistance temperature detector, in particular a 100 ohm platinum resistance temperature detector with a 0.00392 ohm/ohm/°C. curve having a span of 0° to 150° C. with a nominal value of 75° C. The outputs of the detectors 150,152 and 154 are applied to an appropriate decisional logic circuit 158 which functions to select the highest representative signal from the detectors which then is available at the output 160. The signal output 160, in turn, is applied to the process variable input of a stator temperature controller 162 and to an alarm circuit generally designated 164. In the alarm circuit 164, a determination is made if the signal at 160 represents a stator temperature greater than a predetermined amount, for example 115° C., and if so an alarm component is activated. The controller 162 can be of the two-mode proportional and integral type, and by way of example the span can be 0° to 150° with a set point nominally of 115° C.

Normally the operation of generator 80 will be at a stator temperature below the set point in which case the output of controller 162 at 168 will be a high level signal. If the generator stator temperature reaches an abnormal high level, i.e. above the alarm temperature value and set point temperature value, the alarm 164 is activated and the controller output signal 168 goes to a low level. The low level signal at 168, in turn, causes the control system to adjust an appropriate manipulated variable to achieve maximum safe output of generator 80. As will be described in detail presently, the reactive kilovolt amperes is adjusted near to zero or to zero to maintain a preset power factor prior to a reduction in the active kilowatt output.

The generator control means 100 also includes a kilovolt ampere (KVA) controller 174, the function of which is to prevent generator 80 from operating out of its safe capability range. Included within the generator sensing means 94 is a kilowatt sensor 176, a reactive kilovolt ampere (KVAR) sensor 178, a terminal voltage sensor 180, a field current sensor 182 and a field voltage sensor 184. In some instances, these input quantities provided by the sensors can be utilized by the control system directly from equipment associated with the generator. In other instances, signal conversion units such as Transmation Series 3000 analog signal conditioners can be employed.

The kilowatt and KVAR inputs to the control system are combined algebraically in a signal processing component designated 190. Component 190 combines the signals algebraically to arrive at a signal output at 192 which is equated to the instantaneous absolute KVA output from generator 80. This is represeented by the equation:

$$KVA = \sqrt{KW^2 + KVAR^2}$$

where KVA is kilovolt amperes, KW is kilowatts and KVAR is reactive kilovolt amperes. The signal ouput at 192 is applied to the input of KVA controller 174. The set point for KVA controller 174 is provided in the following manner.

The set point is represented by a family of curves, and these curves are a function of kilowatts, terminal voltage and an arc function of field current from the particular generator. By way of example, in an illustrative power plant where each generator 80 is a Siemens-Allis 8700 KVA 4160V.95PF 1207A-3PH 60 HZ 72 rpm synchronous generator driven by a Kaplan turbine, at unity power factor (0 KVAR) the maximum allowable kilowatts is 115% of rated power or 10,005 kilowatts. The terminal voltage will be between the ranges of ±5% of 4160 volts a.c. Typical field currents are:

|  | Unity Power Factor | 0.95 Power Factor |
|---|---|---|
| Rated output | 744 amperes | 592 amperes |
| 115% Rated output | 516 amperes | 653 amperes |

The family of curves for the above mentioned illustrative generator are calculated reactive capability curves plotting KVAR in per unit of rated KVA, leading and lagging, v. kilowatt output in per unit of rated KVA on Siemens-Allis plot no. 0-24610-A dated Dec. 18, 1980 and calculated characteristic curves plotting stator temperature voltage and current against field current on Siemans-Allis plot no. 0-24609-A dated Dec. 18, 1980, both incorporated herein by reference.

The set point is developed according to the foregoing by the signal processing component designated 194 which receives kilowatts, terminal voltage and field current information as shown in FIG. 4. The output 196 of component 194 is applied as a set point to controller 174. Controller 174 can be of the two-mode proportional and integral type. Normally the operating conditions of the generator 80 will be below the set point curve in which case the output 198 of controller 174 will be a high signal level. If the output characteristic of generator 80 equal or exceed the developed set point, the controller output signal 198 will be at a low level. This, in turn, will cause the control system to adjust the appropriate manipulated variable to achieve the maximum safe output of the generator. As will be described in detail presently, the reactive kilovolt amperes is first adjusted near to zero or to zero to maintain a preset power factor.

The generator control means 100 further comprises a field resistance controller 200 for the purpose of preventing an unsafe heating of the rotor windings of generator 80. An increase in the generator rotor temperature is directly proportional to an increase in field resistance. Accordingly, the inputs are generator field voltage and generator field current from the sensors 184 and 182, respectively. These are algebraically combined by a signal processing component 202 to determine the signal equated to the instantaneous field resistance of each generator rotor according to the equation:

$$\text{Field Resistance} = \frac{\text{Field Voltage as d.c. volts}}{\text{Field Current as d.c. amperes}}$$

From this equation the field temperature is equated by the relationship:

Field Temperature =

$$\frac{\text{Field Resistance} - [\text{Rotor Resistance @ 20° times 0.071}]}{\text{Rotor Resistance @ 20° times 0.003}}$$

The resulting value is provided by component 202 and is at the output 204 which is applied as the process variable to the field temperature controller 200. The value also is applied to an alarm circuit 205 which determines if the field resistance is greater than 0.265 ohms which corresponds to a temperature greater than 115° C. If so, an alarm is activated and if not there is no alarm activation.

Controller 200 can be of the three-mode, proportional, integral and derivative type having a span of 0° to 150° C. with an initial set point of 115° C. which is internally adjustable. Normally the operating conditions of generator 80 will be such that the field temperature is below the set point of controller 200 and the output 206 will be a high signal level. If the generator field windings should increase in temperature there will be a proportional increase in resistance. If the field temperature of generator 80 equals or exceeds the safe set point, the output of controller 200 will be a low level signal which, in turn, will cause the control system to achieve the maximum safe output of the generator 80 by reducing the reactive kilovolt amperes as will be described.

The generator control means 100 further comprises a reactive kilovolt ampere (KVAR) controller 210 for the purpose of adjusting the reactive power generation to maintain a preset power factor. Under abnormal conditions KVAR controller 210 will vary the reactive power generation nearer to zero (unity power factor) or to zero (unity power factor) prior to kilowatt power generation reduction. The process variable input 212 to controller 210 is the reactive kilovolt amperes obtained from sensing means 178. The set point for KVAR controller 210 is obtained in the following manner.

A decisional logic component 214 selects the most near zero reactive power generation (unit power factor) signal from three sources and applies that signal via 216 to the set point of controller 210. One of the inputs to decisional component 124 is the signal from the field temperature control, in particular output 206 of field resistance controller 200 as shown in FIG. 4. A second signal input to component 214 is obtained from the stator temperature control or the KVA control in the following manner. The outputs 168 and 198 of the stator temperature controller 162 and KVA controller 174, respectively, are applied to a decisional logic component 220 which selects the lowest signal. The selected signal is made available at 222 and applied to one input of another decisional logic component 224. The other input 226 to component 224 is the reactive kilovolt amperes signal obtained from sensing means 178. If KVAR is zero the selected signal at 222 is the output signal at 102 of the generator control means which then is applied to the decision means 136 of the system shown in FIG. 3 and utilized in a manner which will be described presently. If KVAR is not zero, the selected signal from either temperature controller 162 or KVA controller 174 is made available at 228 and applied to a signal processing component 230 which operates to adjust KVAR near to zero or to zero. The adjusted KVAR signal is present at output 232 and applied as the second input to decisional component 214.

The third input to decisional component 214 is obtained in the following manner. The normal operating power factor will be a continuously indicated, manually operated set point designated 240 in FIG. 4. This is algebraically combined in a signal processing component 242 with a signal indicative of kilowatts at 244 from sensor 176 to provide the third input to decisional component 214. Signal processing component 242 operates according to the relationship:

$$KVAR = KW[\tan(\cos^{-1}\text{power factor set point})]$$

Thus, the most near zero reactive power generation (unity power factor) signal selected by component 214 is the set point to KVAR controller 210. The process variable input 212 to controller 210 is reactive kilovolt amperes and controller 210 can be three-mode proportional, integral and derivative. By way of example, the scale for controller 210 can be 10 MVar leading to 0 to 10 MVar lagging with 100 linear divisions. Controller 210 compares the set point at 216 with the present KVAR input at 212 and provides a signal at 250 indicating either to raise or lower the generator field current. The signal is gated by a decisional logic component 252 in the absence of an inhibit command from source 254 which can represent an external or remote control. Another decisional logic component 256 determines from the value of the signal at 250 whether the manipulated variable is to be increased, thereby providing a signal at 258, or decreased, thereby providing a signal at 260. A time-proportioning pulse is utilized to vary the field current. In particular, the time-proportioning pulse output has duty cycle that is changed based on the magnitude of the deviation of the KVAR from the desired set point. The time-proportioning pulse output signals are provided in connection with the contact output controllers 262 and 264 to signal the appropriate controls 268 and 270 associated with generator 80 to cause raising or lowering, respectively, of the generator field current and are set for each unit.

Figure 5:
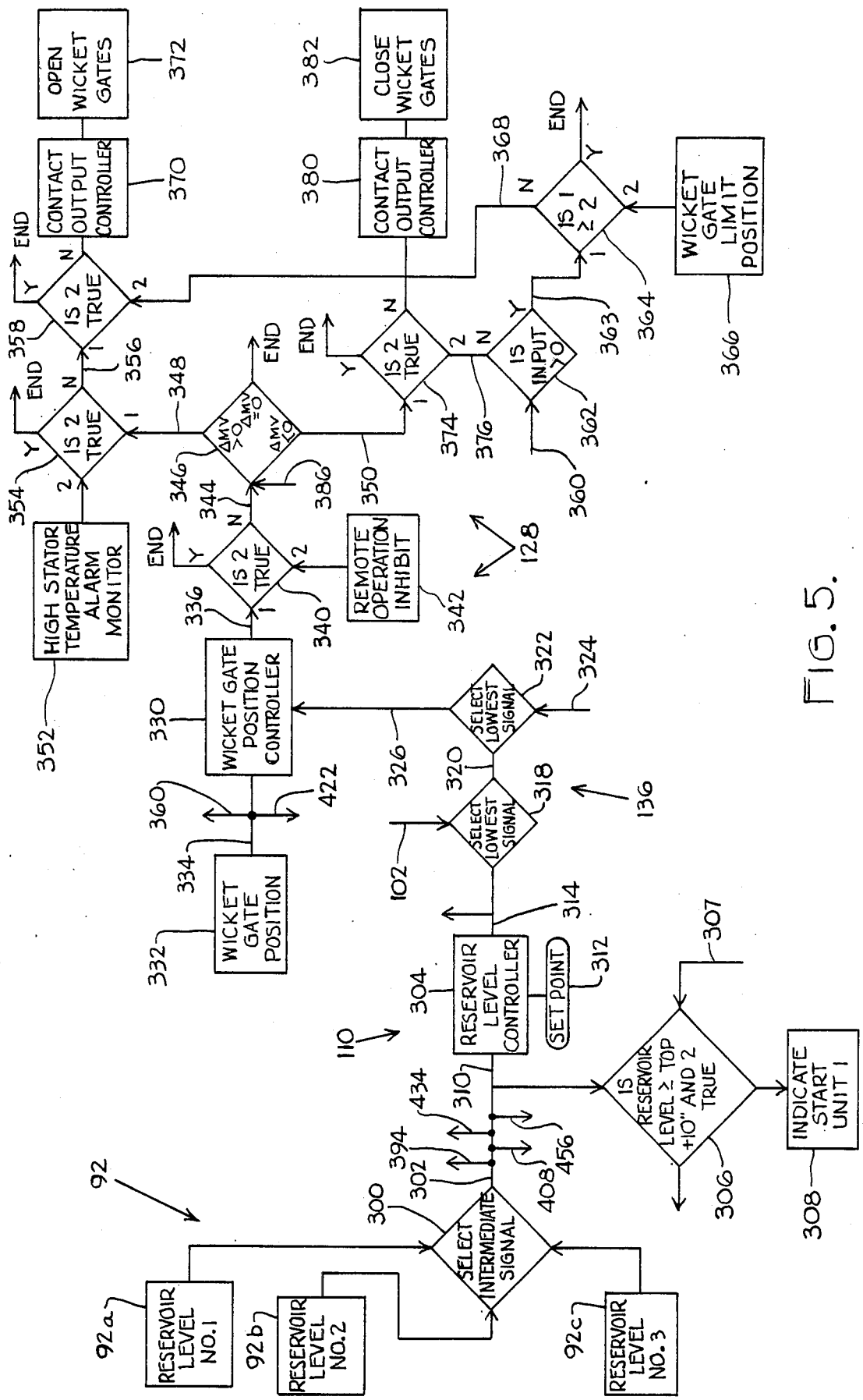
FIG. 5 is a schematic diagram showing in further detail the reservoir level sensing means, reservoir level control, decision means and wicket gate position control means of the system of FIG. 3.

FIG. 5 shows in further detail the reservoir level sensihg means 92, the reservoir level control 110, the decision means 136 and the wicket gate positioned control means 128 of the sstem of FIG. 3. In accordance with the present invention, A plurality of reservoir level sensors, in particular the three sensors 92a, 92b and 92c are employed and the intermediate signal provided by the three sensors is the one selected. This is for the purpose of minimizing the wave effect and redundancy of signal. In particular, the three sensors 92a, 92b and 92c are located on wall 24 shown in FIG. 1 and on the surface facing and exposed to the reservoir 12. The sensors are submerged all at the same depth and are spaced apart horizontally a distance which is suitable to minimize the wave effect. By way of example, in an illustrative system, each sensor 92 can be of the electronic pressure transmitter type such as Gould model LPA 3040-200-I-6(30)-22-06 pressure transmitters and each is referenced to atmospheric pressure. Each sensor is mounted at the submerged location by means of suitable pipe. The submerged location is at a few feet below the normal water level and maximum expected ice thickness in the reservoir 12 and the calibrated span of each sensor is sufficient to include a rise in the water level to the maximum. By way of example, each sensor 92 is located at an elevation of 63.0 feet with a calibrated span of 10.0 feet in a reservoir having a normal water level of 66.5 feet, a minimum level of 66.1 feet and an extreme maximum controlled level of 72.5 feet.

The three signals from sensors 92a, 92b and 92c are applied to corresponding inputs of a decisional logic componenet 300 which selects the intermediate signal and makes it available at an output 302. This intermediate signal allows for transmitter calibration, drift, wave action and transmitter failure. The selected signal at 302 is the process variable input to a reservoir level controller 304. The reservoir level signal at 302 also is used to initiate starting of the generating unit, and to this end the signal at 302 also is applied to the input of a decisional logic component 306 associated with a signal generator 308 providing a command signal indicating startup of the unit in a manner which will be described.

The primary control function of this portion of the system of the present invention is to control the level of reservoir 12. This is important and advantageous to maintain river navigation and to maximize and optimize power generation by the hydroelectric plant. Thus, it is desirable to control the reservoir level as close as possible to the crest 18 of dam 16, for example within 0.05 ft. of the crest of the dam. The reservoir level controller 304 has a signal indicative of reservoir level as its process variable input at 310. The control function of controller 304 is two-mode proportional and integral, and for the above-mentioned illustrative system where sensors 92 are at an elevation of 63.0 ft., controller 304 has a scale corresponding to the range between elevations 63.0 and 73.0 with 100 linear divisions. Controller 304 has a continuously indicated, manually operated set point 312. Controller 304 compares the reservoir level signal 302 with the set point 312 and provides a modulating output singal at 314 having an instantaneous value related to the difference between the reservoir level signal and the set point level signal. The set point signal can be at a value, for example, corresponding to the normal reservoir level such that as the water level rises the output signal 314 will rise and as the water level falls signal 314 will fall. The manipulated output 314 of controller 304 is utilized as the primary set point input to the wicket gate position control means 128. Safety considerations may override this signal. In particular, such safety considerations are provided by information in the signal output at 102 of the generator control means 100 of FIG. 3, and whether or not these override the signal output of controller 304 is controlled by the decision means 136 which now will be described.

The decision means 136 includes a first decisional logic component 318 having one input connected to the output 314 of reservoir level controller 304 and another input connected to output 102 of the generator control means 100. Component 318 functions to select the lowest of the two signal inputs and make it available at output 320 which, in turn, is applied as one signal input to a second decisional logic component 322. The other input 324 to component 322 is obtained from the output of cavitation control means 118 of the system of FIG. 3 which will be described in further detail presently. Component 322 functions to select the lowest of the two signal level inputs and make it available at output 326 which, in turn, is applied as the set point of the controller of the wicket gate control means 128 which now will be described.

The controlled function of this portion of the control system is the wicket gate position, the wicket gates 74 in FIG. 2 being exemplary of means utilized to control the flow of water to the turbine 70. There is provided a wicket gate position controller 330. The set point for controller 330 is the output 326 of component 322. As will be described in further detail presently, this set point for controller 330 is the desired set point for stable and safe operation cascaded primarily from the reservoir level controller 304, or volt ampere controller 174, stator temperature controller 162 or cavitation control 118. The process variable input to controller 330 is the actual wicket gate position. This is obtained from a wicket gate position sensor generally designated 332 which provides a signal at 334 indicative of the actual wicket gate position. By way of example, sensor 332 can be of the potentiometer type. In the foregoing illustrative example of the combination of a Kaplan turbine and Siemens-Allis generator, sensor 332 can have a linear range of 125 ohms to 833 ohms, a span of 0 to 100% with a nominal value of 65%. Controller 330 is of the three-mode proportional, integral and derivative type having a scale of 0–100 with 100 linear divisions. It compares a signal at 324 indicative of actual wicket gate position with the set point signal at 326 and provides an output at 336 indicating whether the wicket gates should be opened or closed. Controller 330 can have an adjustable deadband around the set point to prevent constant seeking of exact equality of set point and wicket gate position thereby minimizing hunting.

The controller output signal 336 is applied to one input of a decisional logic component 340, the other input of which is from a signal source 342 for inhibiting operation under certain conditions such as other system abnormalities signalled from a remote control. A signal from 342 causes all control to cease until the inhibit signal no longer is present. In the absence of a signal from 342, component 340 gates the signal 336 to an input 344 of a decisional logic component 346. If the controller output signal 336 commands a change in the manipulated variable greater than zero corresponding to an open wicket gates command, the signal is gated by component 346 to output 248. If the controller output signal 336 commands a change in the manipulated variable less than zero corresponding to a close wicket gates command, component 346 gates the signal to output 350. If the controller output signal 336 indicates no change in the manipulated variable there is of course no commanded change in the wicket gate position.

If a high stator temperature occurs activating alarm 164 shown in FIG. 4 this is sensed by a monitor 352 which applies a signal to one input of a decisional logic component 354 to which output 348 also is connected thereby inhibiting further gating of the signal at 348 and thus preventing any further opening of the wicket gates in view of the high stator temperature situation. In the absence of the alarm, component 354 gates the signal via 356 to the input of another decisional logic component 358. The function of component 358 is to inhibit the signal 356 from causing further opening of the wicket gates if the actual wicket gate position is equal to or more open than a specified wicket gate limit position. In particular, the actual wicket gate position signal from sensor 332 is applied via line 360 to the input of a decisional logic component 362 as shown. A zero level signal on 360 corresponds physically to closed wicket gates, and a signal greater than zero to opened wicket gates. If the signal at 360 is greater than zero, i.e. the wicket gates are open, component 362 gates the signal at 360 to output 363 which is applied to one input of another decisional logic component 364, the other input of which is obtained from a source 366 providing a signal corresponding to the desired limit position, i.e. maximum open position, of the wicket gates. If the actual position is greater than or equal to the limit position, the output 368 will be true and is applied to the other input of component 358 inhibiting any further opening of the wicket gates. If the actual wicket gate position is less than the limit position, the output 368 will be false thereby causing component 358 to gate further on the signal 356 and thereby allow the open wicket gates command to proceed.

Thus, if the signal at 356 is not inhibited by component 358 it is applied to a contact output controller 37 to provide an open wicket gate command to an appropriate control means designated 372 in a form of a time-proportioning pulse to further open the wicket gates, in particular by means of the turbine governor controls. The time-proportioning pulse has a cycle that is changed based on the magnitude of the deviation of the process variable, i.e. wicket gate position, from the set point.

The output 350 of component 346 is applied to one input of a decision logic component 374, the function of which is to inhibit the signal at 350 if the wicket gates are fully closed. This would correspond to a zero level signal at 360 causing component 362 to provide a true output at 376 applied to component 374. If not, the close wicket gate command signal 350 is gated to a contact output controller 380 to provide a close wicket gate command to controls designated 382 in the form of a time-proportioning pulse to close the wicket gates by means of the turbine governor controls. The time-proportioning pulse has a duty cycle that is changed based on the magnitude of the deviation of the process variable, i.e. wicket gate position, from the set point.

When the control system of the present invention is employed with a plurality of turbine-generator units, i.e. the two units of the present illustration, under normal conditions it is desired to have the wicket gate positions of the two units controlled in a nearly equal position. The two wicket gate position controllers of the corresponding two units should be communicative to eliminate oscillation of control of the two units. To this end, the inputs of the manipulated variable decision logic components 346 of the two units are connected as indicated at 386. Under abnormal conditions, the unit with the abnormal situation will be operated at the highest output to maintain a safe condition. The other turbine-generator unit will continue to maximize the run-of-river flow to maintain the reservoir level. When the abnormal condition has been cleared, the two units again maintain nearly identical wicket gate positions.

Figure 6:
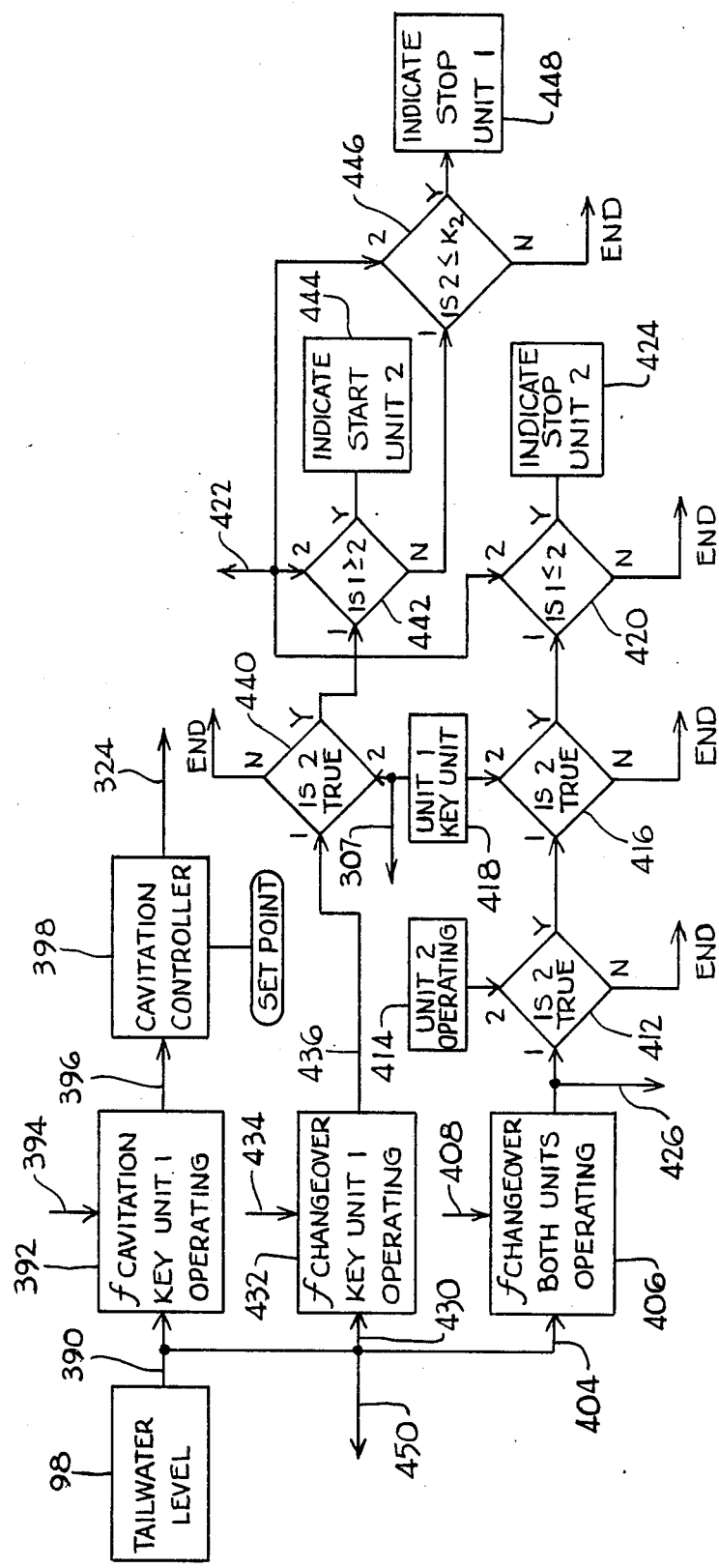
FIG. 6 is a schematic diagram showing in further detail the tailwater level sensing means and cavitation control of the system of FIG. 3 together with an interface to another unit in the controlled power plant.

FIG. 6 shows in further detail the cavitation control 118 in the system of FIG. 3. The function of the cavitation control is to prevent an unsafe flow condition that has as an end result a cavitational pitting damage to the blades of the turbine 70. The single tailwater sensor 98 is identical to each of the reservoir level sensors 92 described and exemplified in connection with FIG. 5. By way of example, sensor 98 is submerged at an elevation of 45 feet in the tailwater channel 26, being located on wall 28 and having a calibrated span of 10 feet where the illustrative tailwater level normally is at 49.3 ft. with a minimum of 47.1 ft. and an extreme maximum of 64.0 ft. The output of sensor 98 at 390 is applied to one input of a signal processing component 392, the other input 394 providing the reservoir level signal from output 302 in FIG. 5. Component 392 processes the signals to provide an output signal at 396 functionally related to the present wicket gate position which, in turn, is applied as the process variable input to a cavitational controller 398. The set point 400 of cavitational controller 398 is determined according to the following algebraic relation:

$$\text{Cavitation Controller Set Point} = \frac{(K1 - TL)}{K3(RL - TL) + K4} + K2$$

Where RL is the absolute reservoir level, TL is the absolute tailwater level and K1–K4 are constants associated with the particular turbine employed and are determined from efficiency information provided by the manufacturer of that turbine including characteristics of the turbine obtained from scale models thereof and mathematical models of the water flow conditions at the location of use. Controller 398 is of the two-mode proportional plus integral type and functions to compare the present wicket gate position with the set point value obtained in the above calculation. Normally, operating conditions are such that the wicket gate position is below the set point calculation. Therefore, the output 324 will be high. If an area of cavitation is approached, the output 324 decreases to a lower level causing adjustment of the wicket gates to achieve maximum safe output of the generator in a manner which will be described.

The control system of the present invention as shown in further detail in FIGS. 4-6 operates in the following manner. Under normal operation of the turbine 70 and generator 80 combination, the output 314 of reservoir level controller 304 is a modulating signal, the output of volt-ampere controller 174 is a high level signal, the output 168 of stator temperature controller 162 is a high level signal, and the output 324 of cavitation controller 398 also is a high level signal. Under normal conditions, therefore, by means of the low magnitude selectors in the form of decisional logic components 220, 224, 318 and 322 the reservoir level output, i.e. modulating signal, would be passed as the appropriate output to consider. This output is processed to the wicket gate position controller 330 as previously described to be used as the cascaded set point. As the level of reservoir 12 changes the set point of the wicket gate position controller 330 is automatically adjusted to open or close the wicket gates 74. This will allow more or less water to flow through turbine 70 thus lowering or raising the reservoir level. In particular, under normal conditions, as the level of water in reservoir 12 rises the wicket gates are caused to open further and as the water level in reservoir 12 falls the wicket gates are moved to a further closed position. As a result, the level of reservoir 12 is controlled with the advantageous results of maximizing and optimizing power generation by the hydroelectric plant and maintaining river navigation.

Under abnormal conditions, the most abnormal situation will take precedence in the control system. For example, if the volt-ampere signal enters an unsafe condition causing the signal output 198 of volt-ampere controller 174 to change to a low level, the following will occur in an orderly manner. If the stator temperature is more abnormal, this takes precedence over volt-ampere. In particular, if the output 168 of stator temperature controller 162 goes lower than output of 198 of volt-ampere controller 174, the stator temperature controller signal 168 is gated by the decision logic component 220. If the volt-ampere is not zero, the reactive volt-ampere is adjusted nearer to zero or to zero as described previously in conjunction with FIG. 4. If the reactive volt-ampere is zero, the stator temperature output signal is gated by decision logic component 224 as the signal on line 102 from the generator control means. This output is compared to the output 314 of reservoir controller 304 by decision logic component 318 of FIG. 5 and the lowest level of the two signals is gated by component 318. Unless the modulating output 314 of reservoir controller 304 was sufficiently low in response to falling river level, the stator temperature signal most likely is passed by component 318. This, in turn, is compared by logic component 322 to the output 324 of caviation controller 398 showin in FIG. 6 and the lowest of the two signals is gated by component 322 and applied at 326 to the set point of the wicket gate position controller 330. As a result, the control system will bring the wicket gate position to the least flow to maintain safe conditions.

By way of further illustration, if the stator temperature enters an unsafe condition, the output 168 of stator temperature controller 162 will decrease to a low level. If the volt-ampere signal is more abnormal it shall have precedence by virtue of decision logic component 220 selecting the lowest of the volt-ampere and stator temperature signals at 198 and 168, respectively. If not, the output signal of stator temperature controller 162 is gated by component 220 and used to adjust the reactive volt-ampere previously described in connection with FIG. 4. Thus, if the reactive volt-ampere is not zero, the reactive volt-ampere is adjusted nearer to zero or to zero as previously described. If the reactive volt-ampere is zero, the lowest of the stator temperature controller output 168 or volt-ampere controller output 198 signals is the output 102 of the generator control means and compared by decision logic component 318 to the output 314 of the reservoir level controller 304. Again, unless the reservoir level is falling such that the signal 314 is lower than that on 102, the signal at 102 is gated by component 318 and applied to component 322 for comparison with the output signal 324 of caviation controller 398 and the lowest is gated by component 322 to output 326 as the set point of wicket gate position controller 320. The result will be to bring the wicket gate position to the least flow to maintain safe conditions.

If the turbine 70 approaches an area of cavitation, the following will occur. The output 324 of cavitation controller 398 is compared by component 322 to the lowest of either the reservoir level controller output 314 or generator control signal 102 to determine the lowest value. The lowest output is used to cascade the set point of the wicket gate position controller 330 to adjust the wicket gates to achieve the maximum safe output of generator 80.

By way of example, an illustrative hydroelectric plant including the control system of the present invention includes two turbine-generator units each including a Kaplan turbine and Siemens-Allis generator as previously described. Each unit will provide an output of 8.4 megawatts for a total plant output of 16.8 megawatts operating at a head of 19 ft. with a rated plant water flow of 12,000 cubic feet per second, and an average flow of 8000 cubic ft. per second. The reservoir water level is normally 66.5 ft., a minimum of 66.1 and an extreme maximum of 76.6 ft. The top of dam 16 is 66.6 ft., the tailwater level is 49.3 ft. with a minimum of 47.1 ft. and a maximum of 64.0 ft. The rate of increasing water flow through the plant is normally 100 cubic ft. per second per hour and a maximum of 2000 cubic feet per second per hour, the rate of decreasing flow is 100 cubic ft. per second per hour and a maximum of 1000 cubic ft. per second per hour, the normal rate of increasing water level of reservoir 12 is 0.03 ft. per hour and the maximum rate is 0.35 ft. per hour the normal rate of decreasing level of reservoir 12 is 0.03 ft. per hour and the maximum rate is 0.1 ft. per hour. The wicket gates 74 of the Kaplan turbine have a dead time of 8 seconds and a 20 to 100% travel time of 30 seconds both typical. The flow at rated output for each unit is 6000 cubic ft. per second at a maximum full gate flow of 6500 cubic ft. per second and a minimum flow of approximately 1500 ft. per second.

The illustrative generator field voltage is 0 to 500 volts d.c., a nominal voltage of 50 to 444 volts d.c. and a rated voltage of 152.74 volts d.c. The generator field current measured at 0 to 100 millivolts d.c. has a span of 0 to 1000 amperes d.c., a nominal range of 200 to 700 amperes d.c., a maximum for 30 seconds of 1564 amperes d.c., and a rated current of 592 amperes d.c. The generator terminal voltage measured at 0 to 1 milliampere d.c. has a span of 3150 to 5250 volts a.c. and a nominal value of 4160 volts a.c. ±5%. The power output of each unit at a current of 0.916 milliamperes is a span of 0 to 10 megawatts with a nominal value of 8.3 megawatts. The reactive volt ampere at a current of 0.333 milliamperes is 10 megavars leading to 0 to 10 megavars lagging with a nominal value of 2.6 megavars lagging. The stator temperature, wicket gate position, wicket gate limit position, reservoir levels and tailwater levels are those previously described.

Figure 7:
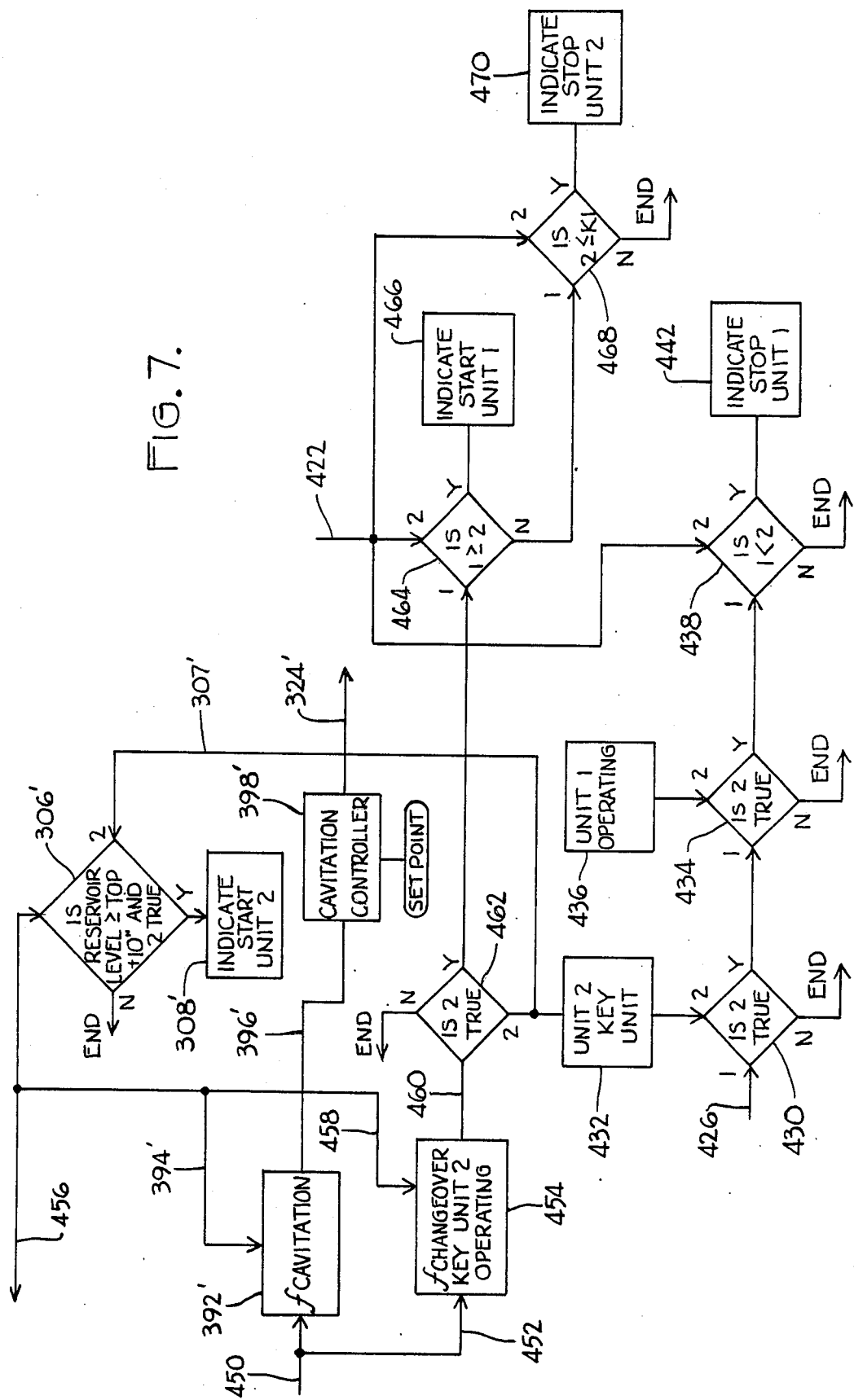
FIG. 7 is a schematic diagram showing the cavitation control of another unit in the controlled power plant and interface to the system shown in FIGS. 4–6.

FIGS. 6 and 7 further illustrate operating relationships between the two turbine-generator units in the illustrative system described hereinabove. They are identified as Unit 1 and Unit 2. In FIG. 7 the cavitation control and start-up indicator for the other unit, i.e. unit 2, are shown and identified by the same reference numerals with a prime designation as the corresponding components in FIGS. 5 and 6. One of the units is designated as the key unit for control purposes.

When the two units are operating and the wicket gate position on the units is equal to or less than the position defined by the following algebraic function:

$$WGP = K5(RL-TL) + K6$$

where WGP is Wicket Gate Position, RL is Reservoir Level, TL is Tailwater Level and K5 and K6 are constants, a signal output is provided indicating the need to stop the non-key unit. Referring to FIG. 6, the output signal 390 from tailwater level sensor 98 is applied to input 404 of a signal processing component 406 to which the reservoir level signal 302 is applied at 408. Component 406 provides an output at 410 corresponding to wicket gate position determined by the foregoing algebraic equation. In the situation with both units operating, Unit 1 being the key unit and Unit 2 the non-key unit, the signal at 410 is gated by a decision logic component 412 in view of an indication from a signal generator 414 that Unit 2 is operating and is gated further by another decision logic component 416 in view of an indication from signal generator 418 that Unit 1 is the key unit. Thus, the signal at 410 is applied to one input of a decision logic component 420. The other input to component 420 is the actual wicket gate position signal from sensor 332 via line 422. If the output 410 of component 406 is less than or equal to the actual wicket gate position indicated at 422, the signal generator 424 is operated to indicate that Unit 2, the non-key unit, should be stopped.

On the other hand, again with both units operating but with Unit 2 being the key unit and unit 1 being the non-key unit, referring to FIG. 7 output 410 of component 406 is applied by line 426 and gated by a decision logic component 430 in view of the indication from a signal generator 432 that Unit 2 is the key unit and gated further by another decision logic component 434 in view of the signal from generator 436 that Unit 1 is operating. Thus, the signal at 410 is applied to one input of a decision logic component 438, the other input of which is a signal indicative of actual wicket gate position on line 422 as previously described. If the output 410 of component 406 is less than the actual wicket gate position indicated by the signal on 422, a signal generator 422 is operated to indicate that Unit 1, the non-key unit, should be stopped.

When the key unit is operating alone and the wicket gate position is equal to or greater than the position defined by the following algebraic function:

$$WGP = K7(RL-TL) + K8$$

where WGP is wicket gate position, RL is reservoir level, Tl is tailwater level and K7 and K8 are constants, a signal is provided indicating the need to start the second unit. In addition, when the wicket gate position drops to a predetermined set point, which is established as the minimum wicket gate opening for one unit operation, a signal is provided indicating the need to stop the key unit.

Referring to FIG. 6, when unit 1 is the key unit operating alone, the output 390 of tailwater sensor 98 is applied to input 430 of a signal processing component 432 to which the reservoir level signal 302 is applied at input 434. Component 432 provides an output at 436 representative of wicket gate position according to the foregoing algebraic relation. It is gated by a decision logic component 440 in view of the indication from signal generator 418 that Unit 1 is the key unit and applied to one input of another decision component 442, the other input of which is the signal at 422 indicative of actual wicket gate position from output 334 in FIG. 5. If the output 436 of component 432 is equal to or greater than the actual wicket gate position, the signal generator 444 is operated to signal the start of Unit 2. If the signal is not of such magnitude it is applied to the input of another decision logic component 446 to which the actual wicket gate position signal on 422 is applied. If the actual wicket gate position is equal to a predetermined minimum, for a period of time typically one hour a signal generator 448 is operated to signal that Unit 1 should be stopped.

On the other hand, when Unit 2 is the key unit operating alone, the output 390 of tailwater sensor 98 is applied via 450 to input 452 of a signal processing component 454 shown in FIG. 7 to which the reservoir level signal 302 is applied by a line 456 to input 458. Component 454 provides an output of 460 representative of wicket gate position according to the foreoing algebraic relationship. It is gated by a decision component 462 in view of the signal from generator 432 indicating that Unit 2 is the key unit to one input of another decision logic component 464. The other input to component 464 is the actual wicket gate position signal at 422. If the output 460 of component 454 is equal to or greater than the actual wicket gate position signal, a signal generator 466 is operated to indicate that Unit 1 should be started. If it is not, it is applied to an input of another decision logic component 468 to which the actual wicket gate position signal on 422 also is applied. If it is less than or equal to a predetermined minimum for a period of time, typically one hour, a signal generator 470 is operated to indicate that Unit 2 should be stopped.

In the foregoing description the constants K5-K8 are associated with the particular turbine employed and are determined from information provided by the manufacturer of that turbine including characteristics of the turbine determined from scale models thereof and mathematical models of the water flow conditions at the location of use.

The controllers utilized in the system of the present invention can be of various commercially available forms, and by way of example, in an illustrative system the controllers include Toshiba Multi-Variable One Loop Controllers TOSDIC-211/212. For example, the reservoir level control, field temperature control and cavitation control can employ the TOSDIC 211 and the wicket gate position control, stator temperature control, KVAR control and KVA control can employ the TOSDIC 212.

Figure 8:
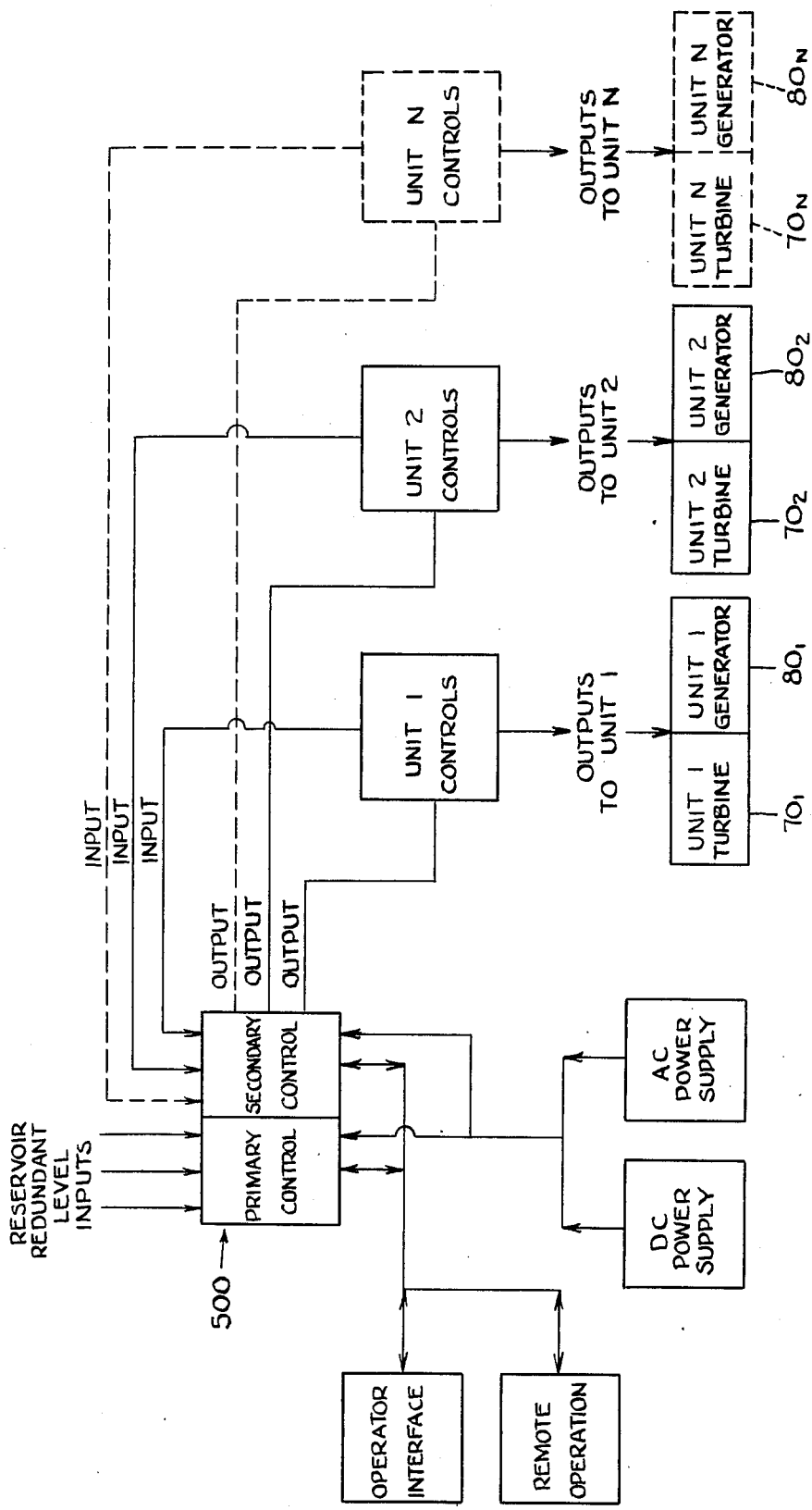
FIG. 8 is a block diagram illustrating the organization of the control system of the present invention with a plurality of turbine-generator units.

FIG. 8 illustrates, briefly, the organization of the control system of the present invention with a plurality of turbine-generator units. The control system is generally designated 500 and by primary control is meant the reservoir level control and by secondary control along with the unit controls is meant all the other control functions described hereinabove. Each turbine-generator unit is similar to the combination of turbine 70 and generator 80 described above.

It is therefore apparent that the present invention accomplishes its intended objects. While an embodiment of the present invention has been described in detail, that is for the purpose of illustration, not limitation.

We claim:

1. In a hydroelectric power plant adjacent a dam defining upper and lower levels of a body of water, said plant having an intake section, a power generating section, and a discharge section, said upper level including a reservoir leading to the plant intake, means defining a return of water from the discharge of the plant to the lower level of body of water, a turbine in the power generating section operated by the flow of water through the plant and an electrical generator operated by said turbine, the amount of water flowing to the turbine being controlled by adjustable flow control means, a control system comprising:
   (a) means for sensing the level of water in the reservoir leading to the power plant intake for providing a signal indicative of changing water level;
   (b) means operatively connected to said generator for sensing the generator electrical and thermal operating characteristics and providing signal information indicative thereof; and
   (c) control means operatively connected to said water level sensing means and generator sensing means and connected in controlling relation to said flow control means for causing adjusting of said flow control means to vary the amount of water flowing to said turbine to adjust the turbine power in response to changing water level in said reservoir and within the safe and allowable operating range of said generator.

2. A control system according to claim 1, wherein said control means further comprises means for raising or lowering the level of field current in said generator in response to signals from said generator sensing means.

3. A control system according to claim 1, further including:
   (a) means for sensing the level of water after discharge from said plant during the return to said lower level; and
   (b) cavitation control means operatively connected to said level sensing means and to said flow control means for causing changing of said flow control means in response to approach of a cavitation condition.

4. A control system according to claim 1, wherein said turbine and generator comprise a unit, together with another unit comprising another turbine and generator, said level sensing means being common to both units and there being a generator sensing means and control means for each unit.

5. A control system according to claim 4 further including means to indicate one of said units as a key unit and means to determine when the flow control means is at or below a predetermined state and to then indicate the need to stop the non-key unit when both units are operating.

6. A control system according to claim 4 further including means to indicate one of said units as a key unit and means to determine when the flow control means is at or above a predetermined state and to then indicate the need to start the non-key unit when only the key unit is operating.

7. A control system according to claim 6, further including means to determine when the flow control means is below a predetermined state established as the minimum for one unit operation and then to indicate the need to stop the key unit when only the key unit is operating.

8. A control system according to claim 1, wherein said turbine flow control means comprises wicket gate means and wherein said control means causes opening of said wicket gate means in response to rising water level and causes closing of said wicket gate means in response to falling water level.

9. A control system according to claim 1, wherein said generator sensing means includes means to sense generator stator temperature and means to sense generator electrical quantities including watts, reactive volt amperes, terminal voltage, field current and field voltage and wherein said control means normally causes changing of said flow control means to adjust the turbine power in response to changing water level and includes means to override such changing in response to abnormal condition of said stator temperature or generator electrical characteristics and to change said flow control means in a manner within said safe and allowable operating range of said generator.

10. A control system according to claim 9, wherein said control means includes means enabling the most abnormal of said conditions to take precedence in causing said control means to maintain said safe and allowable operating range of said generator.

11. A control system according to claim 9, further including means for sensing the level of water after discharge from said plant during the return to said lower level and cavitation control means operatively connected to said level sensing means and to said control means for causing changing of said flow control means in response to approach of a cavitation condition to maintain a safe and allowable operating range of said turbine.

12. A control system according to claim 11 wherein said control means includes means enabling the most abnormal of said conditions to take precedence in causing said control means to maintain said safe and allowable operating range of said generator and said turbine.

13. In a hydroelectric power plant adjacent a dam defining upper and lower levels of a body of water, said plant having an intake section, a power generating section and a discharge section, said upper level including a reservoir leading to said plant intake, means defining a return of water from the plant discharge to said lower level, a turbine in said power generating section operated by the flow of water through the plant and an electrical generator operated by said turbine, the amount of water flowing to the turbine being controlled by flow control means in response to control signals applied thereto, a control system comprising:
  (a) sensing means in said reservoir responsive to reservoir water level for producing a signal indicative of changing water level;
  (b) reservoir level control means operatively connected to said sensing means for comparing said signal to a reference in a manner producing an output command signal in response to changing water level in said reservoir;
  (c) sensing means operatively associated with said generator responsive to generator electrical and thermal operating characteristics and providing signal output information indicative thereof;
  (d) generator control means operatively connected to said generator sensing means for comparing said signal output information to reference information and providing an output signal in accordance with the comparison;
  (e) flow control position sensing means for providing a signal indicative of actual position of said flow control means;
  (f) flow control position control means operatively connected to said flow control sensing means for comparing said signal to a reference input in a manner producing an output signal to command an amount of opening or closing of the flow control means as determined by the comaparison; and
  (g) decision means connected to the outputs of said reservoir level control means and said generator control means for selecting signals therefrom according to a predetermined precedure and applying the signal to said reference input of said flow control position control means;
  (h) so that said flow control means is progressively opened to increase the operation of said turbine in response to rising water level in said reservoir and progressively closed in response to falling water level in said reservoir within the safe allowable operating range of said generator.

14. A control system according to 13, further including:
  (a) tailwater level sensing means located outwardly of said plant discharge in the return to said lower level for producing a signal indicative of the water level therein;
  (b) cavitation control means operatively connected to said sensing means for comparing said signal to a reference in a manner producing an output signal in response to approach of an area of cavitation; and
  (c) means for connecting the output of said cavitation control means to said decision means.

15. Apparatus according to claim 13, wherein said generator control means further includes means to command increase or decrease in the field current of said generator.

16. Apparatus according to claim 13, wherein said sensing means responsive to said generator electrical and thermal operating characteristics comprises means for sensing generator stator temperature and providing a signal indicative thereof, and wherein said generator control means comprises stator temperature controller means operatively connected to said stator temperature sensing means for comparing said signal to a reference to provide an output signal indicative of the comparison, said decision means utilizing said signal to produce said output signal of said generator control means.

17. Apparatus according to claim 13, wherein said sensing means responsive to generator electrical and thermal characteristics comprises:
  (a) sensing means responsive to generator field current for producing a signal indicative thereof;
  (b) sensing means responsive to generator terminal voltage for producing a signal indicative thereof;
  (c) sensing means responsive to generator reactive volt-amperes for producing a signal indicative thereof;
  (d) sensing means responsive to generator watt output for producing a signal indicative thereof;
and wherein said generator control means comprises:
  (e) first signal processing function means having inputs connected to said reactive volt-ampere sensing means to said watt sensing means for providing an output signal according to a functional relationship;
  (f) second signal processing function means operatively connected to said field current, terminal voltage and watt sensing means for providing an output signal according to a functional relationship;
  (g) volt ampere controller means operatively connected to the outputs of said first and second signal processing function means for comparing the same and providing an output signal indicative of the comparison; and
  (h) decision means utilizing said output signal from said volt ampere controller means to produce said output signal of said generator control means.

18. Apparatus according to claim 13, wherein said sensing means responsive to generator electrical and thermal characteristics comprises:
  (a) sensing means responsive to generator stator temperature and providing a signal indicative thereof;
  (b) sensing means responsive to generator field current for producing a signal indicative thereof;
  (c) sensing means responsive to generator terminal voltage for producing a signal indicative thereof;
  (d) sensing means responsive to generator reactive volt-amperes for producing a signal indicative thereof;
  (e) sensing means responsive to generator watt output for producing a signal indicative thereof;
and wherein said generator control means comprises:
  (f) stator temperature controller means operatively connected to said stator temperature sensing means for comparing said temperature signal to a reference to provide an output signal indicative of the comparison;
  (g) first signal processing function means having inputs connected to said reactive volt-ampere sensing means and to said watt sensing means for providing an output signal according to a functional relationship;
  (h) second signal processing function means operatively connected to said field current, terminal voltage and watt sensing means for providing an output signal according to a functional relationship;
  (i) volt ampere controller means operatively connected to the outputs of said first and second signal processing function means for comparing the same and providing an output signal indicative of the comparison; and
  (j) decision means utilizing said output signals from said stator temperature controller means and said ampere controller means and said reactive volt ampere sensing means to produce said output signal of said generator control means.

19. Apparatus according to claim 18, further including:
   (a) field temperature controller means connected to said sensing means responsive to generator field voltage and field current;
   (b) means connected to said field temperature controller means, said decision means and to said watt output sensing means to select the most means unity power factor signal; and
   (c) reactive volt ampere controller means having an input connected to said reactive volt ampere sensing means, a reference connected to said power factor signal sensing means and an output connected to means for controlling generator field current.

20. A method for controlling a hydroelectric power plant adjacent a dam defining upper and lower levels of a body of water, said plant having an intake section, a power generating section, and a discharge section, said upper level including a reservoir leading to the plant intake, means defining a return of water from the discharge of the plant to the lower level of the body of water, a turbine in the power generating section operated by the flow of water through the plant and an electrical generator operated by said turbine, the amount of water flowing to the turbine being controlled by adjustable flow control means, said method comprising:
   (a) sensing the level of water in the reservoir leading to the power plant intake and providing a signal indicative of changing water level;
   (b) sensing the generator electrical and thermal operating characteristics and providing signal information indicative thereof; and
   (c) utilizing said signal indicative of changing water level and said signal information indicative of generator electrical and thermal operating characteristics to adjust said flow control means to vary the amount of water flowing to said turbine to adjust the turbine power in response to changing water level in said reservoir and within the safe and allowable operating range of said generator.

21. A method according to claim 20, wherein said flow control means is opened in response to rising water level to increase the turbine power and closed in response to falling water level within the safe and allowable operating range of said generator.

22. A method according to claim 20, further including:
   (a) sensing the level of water after discharge from said plant during the return of said lower level and providing a signal indicative thereof; and
   (b) utilizing said discharge level signal along with said reservoir level signal to cause changing of said flow control means in response to approach of a cavitation condition.

23. In a hydroelectric power plant adjacent a dam defining upper and lower levels of a body of water, said plant having an intake section, a power generating section, and a discharge section, said upper level including a reservoir leading to the plant intake, means defining a return of water from the discharge of the plant to the lower level of body of water, a turbine in the power generating section operated by the flow of water through the plant and an electrical generator operated by said turbine, the amount of water flowing to the turbine being controlled by adjustable flow control means, a control system comprising:
   (a) means for sensing the level of water in the reservoir leading to the power plant intake for providing a signal indicative of changing water level;
   (b) means operatively connected to said generator for sensing the generator electrical and thermal operating characteristics and providing signal information indicative thereof;
   (c) control means operatively connected to said water level sensing means and connected in controlling relation to said flow control means for adjusting said flow control means to vary the amount of water flowing to said turbine to adjust the turbine power in response to changing water level in said reservoir; and
   (d) said control means including means operatively connected to said generator sensing means for overriding the adjustment of turbine power in response to abnormal generator electrical and thermal operating characteristics so that the adjustment of turbine operating power is within the safe and allowable operating range of said generator.

24. A control system according to claim 23, further including:
   (a) means for sensing the level of water after discharge from said plant during the return to said lower level; and
   (b) cavitation control means operatively connected to said level sensing means and to said control means for adjusting said flow control means in response to approach of a cavitation condition and within the safe and allowable operating range of said generator.

* * * * *